US007166940B2

(12) United States Patent
Ewert et al.

(10) Patent No.: US 7,166,940 B2
(45) Date of Patent: Jan. 23, 2007

(54) EXTERNAL ROTOR MOTOR

(75) Inventors: Andreas Ewert, Lichtenau (DE); Markus Liedel, Pegnitz (DE); William Stevens, Maynard, MA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/776,949

(22) Filed: Feb. 11, 2004

(65) Prior Publication Data

US 2004/0207274 A1 Oct. 21, 2004

(30) Foreign Application Priority Data

Feb. 12, 2003 (DE) ................................ 103 05 649

(51) Int. Cl.
*H02K 5/24* (2006.01)

(52) U.S. Cl. ....................... 310/51; 74/574.4; 310/261; 310/266

(58) Field of Classification Search .................. 310/51, 310/62, 63, 156.26, 261; 74/574.4, 573.12
See application file for complete search history.

(56) References Cited

U.S. PATENT DOCUMENTS 2,594,555 A * 4/1952 Hardy ....................... 74/574.4
4,617,484 A * 10/1986 Buijsen ....................... 310/51
5,796,200 A * 8/1998 Sakashita et al. ...... 310/156.05
6,445,096 B1 * 9/2002 Saito et al. ............... 310/67 R
6,447,272 B1 * 9/2002 Tsuchiya ............... 417/423.12
6,926,498 B1 * 8/2005 Li et al. ......................... 416/3
2003/0006660 A1 * 1/2003 Kehrer et al. ................. 310/90

FOREIGN PATENT DOCUMENTS

EP 0 996 214 4/2000
JP 05-300715 11/1993

* cited by examiner

*Primary Examiner*—Burton Mullins
(74) *Attorney, Agent, or Firm*—Michael Best & Friedrich LLP

(57) ABSTRACT

An external rotor motor is disclosed, which features a stator (11) and a rotor (13) surrounding the stator (11) while leaving an air gap. A damper (16) made of an elastic material is arranged on the outside of the rotor (13) in order to dampen resonant rises in airborne sound, which is emitted by the rotor of the external rotor motor and by an assembly coupled to it. In the case of a rotor (13) that is designed to be pot-shaped, the damper (16) is preferably embodied as a damping cap (17), which surrounds the pot jacket (132) and at least partially covers the pot base (131) (FIG. 1).

22 Claims, 2 Drawing Sheets

EXTERNAL ROTOR MOTOR

STATE OF THE ART

Figure 1:
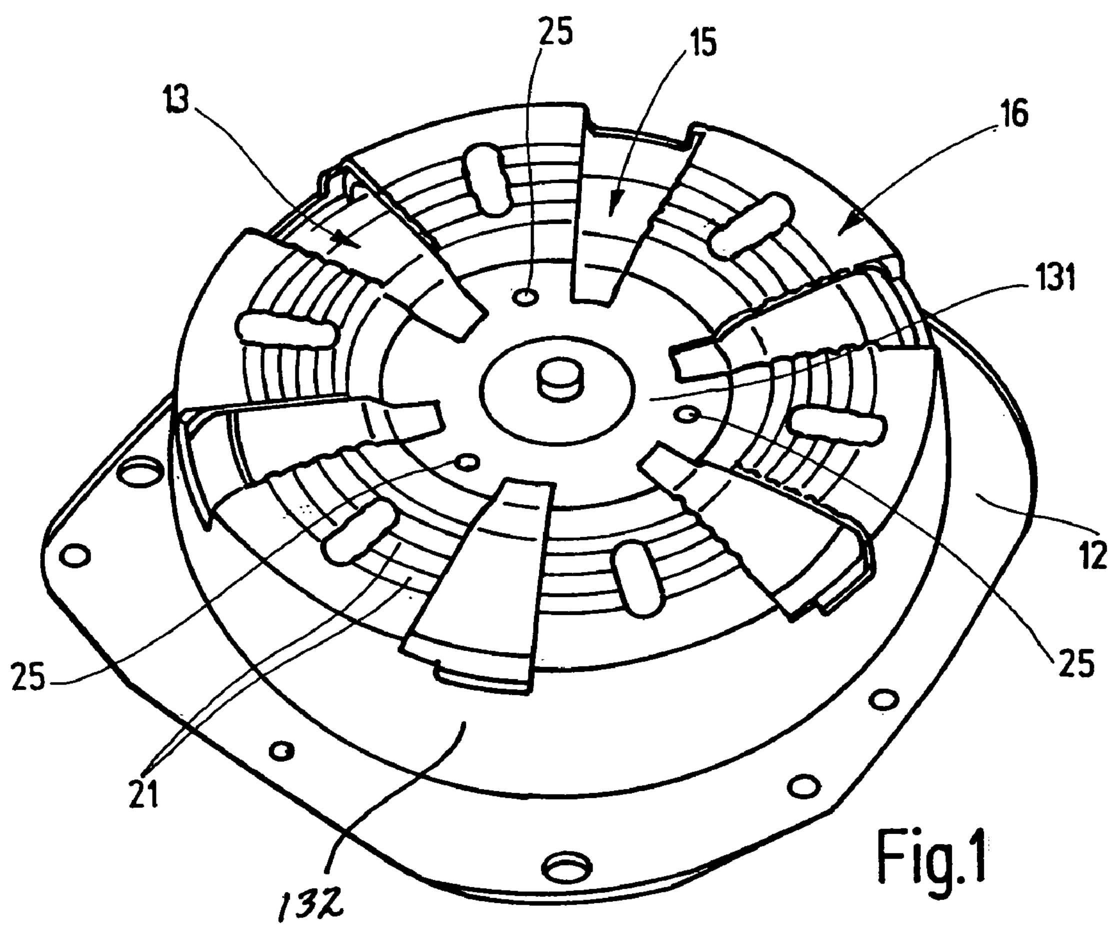

The invention relates to an external rotor motor.

External rotor motors are used in motor vehicle construction in particular to drive fans allocated to the cooling system of the combustion motor and to drive blowers in air conditioning units, since the external rotor motor can be integrated into the hub of the fan wheel or blower wheel in a space-saving manner. The largely cap-shaped or pot-shaped rotor is put into bending vibrations during operation, which trigger resonant rises in the airborne sound emitted by the motor or an assembly (such as fan wheels and blower wheels) that is coupled to the motor.

ADVANTAGES OF THE INVENTION

The external rotor motor in accordance with the invention with the features of Claim 1 has the advantage that resonant rises caused by bending vibrations are clearly reduced in terms of their acoustic perceptibility by the damper made of an elastic damping material that at least partially covers the outside of the rotor. Caoutchouc, rubber, elastomer or polyurethane, such as silicone, as well as their alloys and mixtures are used as materials for the damper.

Advantageous further developments and improvements of the external rotor motor are possible.

In accordance with a preferred embodiment of the invention, the damper is embodied as a one- or two-piece damper cap, which, in the case of a pot-shaped embodied rotor, surrounds its pot jacket and/or at least partially covers its pot base. Because of this design of the damper, contact between the rotor and the damper or between the damper and the assembly coupled to the rotor can occur axially and/or radially and the damping effect can thereby be generated axially and/or radially. In this connection, the contact surfaces between the rotor and the damper are smooth or are provided with raised, rib-like or nub-like elements, which, as elastic tolerance compensation, can be used for initial tensioning as positive engagement or as an assembly aid.

In accordance with an advantageous embodiment of the invention, profiled axial ribs are formed on the inside of the axially extending cap area, i.e., the cap edge, and the axial ribs project radially on the inner surface of the cap edge. These types of axial ribs can be embodied with different profiles in accordance with the desired elasticity of the axial ribs.

In accordance with an advantageous embodiment of the invention, the damper is embodied as an individual part and fastened to the rotor. Alternatively, the damper, in particular in the form as a damper cap, can also be sprayed advantageously onto the rotor, for example using two-component injection molding technology.

In connection with an assembly that is to be driven, in particular a fan wheel or blower wheel, and according to an advantageous embodiment of the invention, the damper is manufactured as an individual part and is clamped between the rotor and the fan wheel hub or blower wheel hub. Because of the gap that is present at any rate between the fan hub or the blower hub and the rotor, which is filled by the damper, no additional construction space is required to accommodate the damper and, as a result, the installation volume for the fan does not change. The effective mechanism of the damper is composed of flexion damping, self-damping, internal damping (absorption) and joint location damping from friction at the contact surfaces or so-called external damping.

In connection with a fan or blower, the damper can also be manufactured as an individual part and fastened to the inside wall of the fan hub or blower hub or sprayed onto the inside wall of the fan hub or blower hub, for example using two-component injection molding technology.

DRAWINGS

The invention is described in more detail in the following on the basis of the exemplary embodiments depicted in the drawings. The drawings show:

FIG. 1 A perspective top view of an external rotor motor with a damper.

Figure 2:
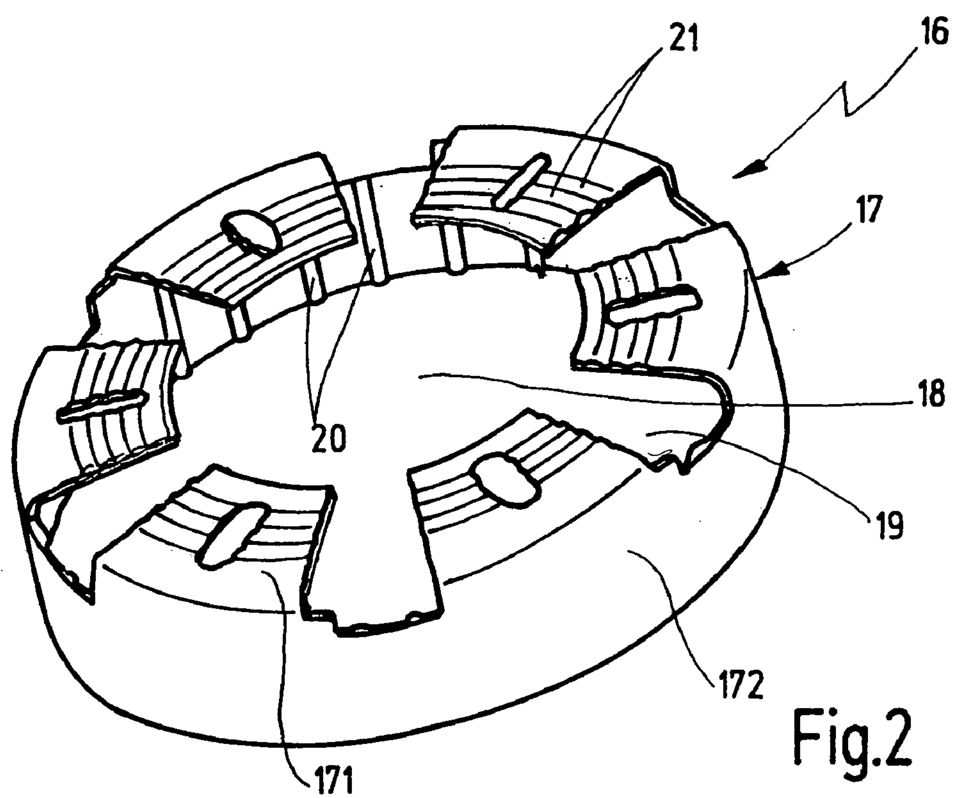

FIG. 2 A perspective top view of the damper in FIG. 1.

Figure 3:
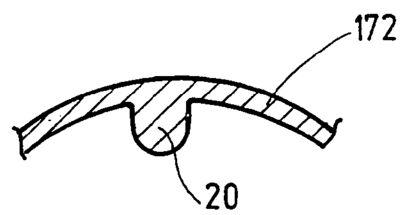
Figure 3:
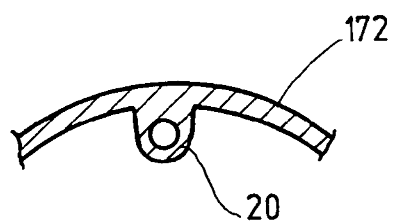
Figure 3:
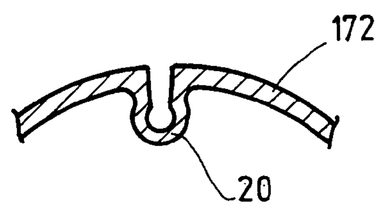
Figure 3:
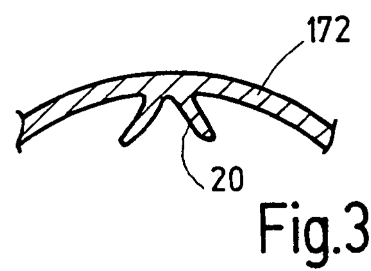

FIG. 3 Sections of different profiles in the jacket area of the damper in FIG. 2.

Figure 4:
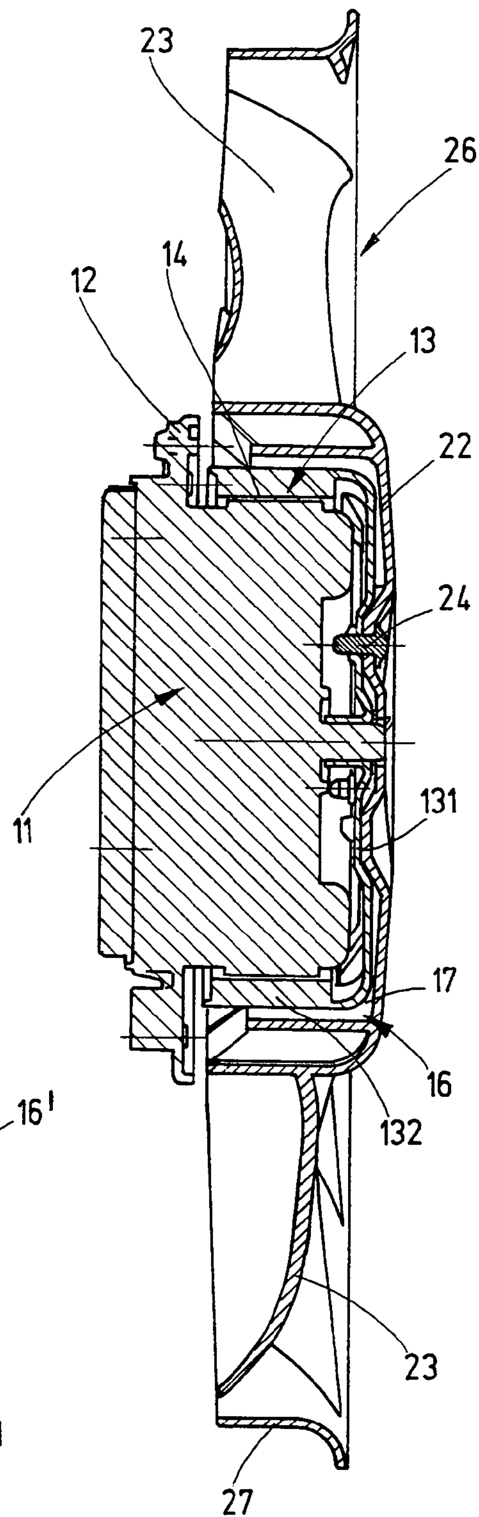

FIG. 4 A longitudinal section of the external rotor motor in accordance with FIG. 1 assembled with a fan wheel.

Figure 5:
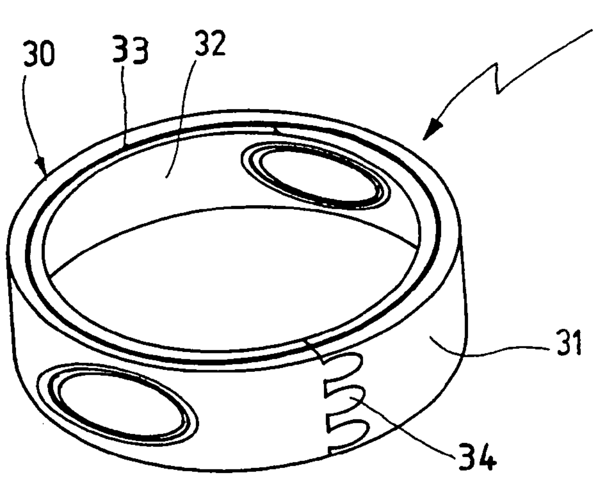

FIG. 5 A perspective representation of the damper in accordance with another exemplary embodiment of the external rotor motor in FIG. 1.

DESCRIPTION OF THE EXEMPLARY EMBODIMENTS

The external rotor motor depicted in a perspective top view in FIG. 1 and in a schematic longitudinal section in FIG. 4 features a stator 11, which is fixed on a carrier plate 12 and a pot-shaped rotor 13 with a pot base 131 and a pot jacket 132, which is positioned rotationally via its pot base 131 on the stator 11 and overlaps the stator 11 with its pot jacket 132, leaving a radial air gap 14. Recesses 15 for motor ventilator are included in the pot base 131. A damper 16 made of an elastic material is placed on the pot-shaped rotor 13 to dampen the resonant rises in airborne sound emitted by the motor caused by bending vibrations that occur in the rotor 13 during operation. Rubber, caoutchouc (particularly EPDM and butyl rubber), elastomers, thermoplastic elastomers, polyurethanes (silicones) and the like are used as elastic materials.

In the exemplary embodiment in FIG. 1, the damper 16 is embodied as a damper cap 17 with a cap base 171 and a cap edge 172, which is clamped on the rotor 13 and completely covers the pot jacket 132 with its cap edge 172 and partially covers the pot base 131 with its cap base 171. A central opening 18 and recesses 19 congruent with the recesses 15 in the pot jacket 132 are provided in the pot base 131. In the exemplary embodiment in FIGS. 1 and 2, the damper 16 that is embodied as a damper cap 17 is manufactured as an individual part and is fastened with its cap edge 172 on the pot jacket 132 of the rotor 13. While the pot jacket 132 of the rotor 13 is embodied to have a smooth surface, profiled axial ribs 20 are formed as a single piece on the inner surface of the cap edge 172 and the ribs project radially toward the pot jacket 132 of the rotor 13. These profiled axial ribs 20 are used for initial tensioning of the damper 16 on the rotor 13 as elastic tolerance compensation and as an assembly aid. The profile of the axial ribs 20 is designed in different ways and correspondingly adapted to the elastic properties desired in the respective application case. Four different profiles of the axial ribs 20 are depicted in FIG. 3.

As shown in FIGS. 1 and 2, concentric annular rings 21 are embodied on the cap base 171. They are used for the same purpose of bracing as the axial ribs 20, but in this case vis-à-vis a to-be-driven assembly fastened to the rotor 13, whether this is a fan wheel 26 of a radiator fan or an air conditioner blower. This type of fan wheel 26 is depicted in a longitudinal section in FIG. 4. It has a hub 22 and a plurality of fan wheel blades 23, which project radially from the hub 22 offset by the same circumferential angle and are fastened at the blade tips to an outer ring 27. The hub 22 is slid onto the rotor 13 equipped with the damper 16 and non-rotatably fixed on the pot base 131 with screws 24, which are screwed into the threaded holes 25 incorporated into the pot base 131 of the rotor 13. The hub 22 and the rotor 13 have close contact via the concentric annular rings 21 so that the damper 16 generates a damping effect the axial direction. The axial ribs 20 press the cap edge 172 of the cap 17 radially at the hub 26 so that there is also close contact here and a damping effect is generated in the radial direction.

In a modification of the described assembly of the external rotor motor and the fan wheel 26, the damper cap 17 is also embodied as an individual part, but not fastened to the rotor 13, but merely clamped between the hub 22 and the rotor 13. The axial ribs 20 that generate a radial initial tension when sliding the damper cap 17 on the rotor 13 are used in this case as an assembly aid to fix the damper 16 on the rotor 13.

In an alternative embodiment, the damper 16 is not manufactured as an individual part, rather it is sprayed onto the rotor 13 or onto the inside wall of the hub 22 as a coating or inner lining. In this case, it can be manufactured as a one-piece multi-component element together with the rotor or the fan wheel 26, for example using two-component injection molding technology. Of course, one component of the multi-component element is then composed of an elastic and damping material.

FIG. 5 depicts another exemplary embodiment of a damper 16'. The damper 16' embodied here as a damper ring 30 is composed of a hybrid material, whereby a soft material ring 33 made of a damping soft component such as a rubber ring is clamped between two metal rings 31, 32. Alternatively, the soft material ring 33 can be replaced by parallel sections of the soft component. This damper ring 30 is clamped on the pot jacket 132 of the rotor 13. In the exemplary embodiment in FIG. 5, the damper ring 30 is axially separated for this purpose at a minimum of one location and, after being slid onto the rotor 13, is closed by means of a mortise and tenon joint 34 embodied at the separation location. The separation location can also be closed by welding instead of mortise and tenon joint 34. In the case of fastening a fan wheel 26, its hub 22 is slid over the damper ring 30.

The invention is not restricted to the described exemplary embodiments of the damper 16, 16'. As a result, both the damper 16 that is embodied as a damper cap 17 can be divided into a cap base 171 and a cap edge 172 and the damper 16' can be realized by several damper rings 30 arranged axially side by side in accordance with FIG. 5.

The invention claimed is:

1. An external rotor motor with a stator (11) and a rotor (13), which surrounds the stator (11) while leaving an air gap (14), wherein at least one damper (16) that is composed at least partially of an elastic material is arranged on the outside of the rotor (13), characterized in that the rotor (13) is pot-shaped with a pot base (131) and pot jacket (132) and that the damper (16) comprises a damper cap (17), which surrounds the pot jacket (132) and at least partially covers the pot base (131).

2. An external rotor motor according to claim 1, characterized in that the radially extending cap base (171) of the damper cap (17) bears axially projecting concentric annular rings (21) on its outer surface facing away from the rotor (13).

3. An external rotor motor according to claim 1, characterized in that profiled axial ribs (20) project radially from the cap edge (172) on the inside, facing the rotor (13), of the axially extending cap edge (172).

4. An external rotor motor according to claim 1, characterized in that the damper (16) is sprayed on the rotor (13).

5. An external rotor motor according to claim 1, characterized in that the damper (16) is fastened radially or axially on the rotor (13).

6. An external rotor motor according to claim 1, characterized in that the damper (16) is fastened radially and axially on the rotor (13).

7. An external rotor motor with a stator (11) and a rotor (13), which surrounds the stator (11) while leaving an air gap (14), wherein at least one damper (16) that is composed at least partially of an elastic material is arranged on the outside of the rotor (13), characterized in that the rotor (13) is pot-shaped with a pot base (131) and pot jacket (132) and that the damper (16) comprises a damper cap (17), which surrounds the pot jacket (132) or at least partially covers the pot base (131), and in that the damper (16) is fastened radially and axially on the rotor (13).

8. An external rotor motor with a stator 11 and a rotor 13, which surrounds the stator 11 while leaving an air gap 14, wherein at least one damper 16' that is composed at least partially of an elastic material is arranged on the outside of the rotor 13, characterized in that the damper 16' comprises a damping ring surrounding the rotor 13 on the outer periphery of the rotor, and characterized in that the damper is made of a hybrid material in which a damping soft component is arranged between two metal rings.

9. External rotor motor according to claim 8, characterized in that damper (16') comprises a damping ring (30) surrounding the rotor (13) and is made of a hybrid material, preferably of metal/soft component/metal.

10. An external rotor motor according to claim 8, characterized in that the rotor (13) is pot-shaped with a pot base (131) and pot jacket (132) and that the damper (16) comprises a damper cap (17), which surrounds the pot jacket (132) or at least partially covers the pot base (131).

11. An external rotor motor according to claim 8, characterized in that the rotor (13) is pot-shaped with a pot base (131) and pot jacket (132) and that the damper (16) comprises a damper cap (17), which surrounds the pot jacket (132) and at least partially covers the pot base (131).

12. An external rotor motor according to claim 8, characterized in that an assembly (26) with a hub (22) driven by the rotor (13) is slid over the damper (16) and non-rotatably connected to the rotor (13).

13. An external rotor motor with a stator (11) and a rotor (13), which surrounds the stator (11) while leaving an air gap (14), wherein at least one damper (16) that is composed at least partially of an elastic material is arranged on the outside of the rotor (13), characterized in that the rotor (13) is pot-shaped with a pot base (131) and pot jacket (132) and that the damper (16) comprises a damper cap (17), which surrounds the pot jacket (132) or at least partially covers the pot base (131), and in that a radially extending cap base (171) of the damper cap (17) bears axially projecting concentric annular rings (21) on its outer surface facing away from the rotor (13).

14. External rotor motor according to claim 13, characterized in that the damper (16) is fastened radially or axially on the rotor (13).

15. An external rotor motor with a stator (11) and a rotor (13), which surrounds the stator (11) while leaving an air gap (14), wherein at least one damper (16) that is composed at least partially of an elastic material is arranged on the outside of the rotor (13), characterized in that the rotor (13) is pot-shaped with a pot base (131) and pot jacket (132) and that the damper (16) comprises a damper cap (17), which surrounds the pot jacket (132) or at least partially covers the pot base (131), and in that profiled axial ribs (20) project radially from an axially extending cap edge (172) on the inside, facing the rotor (13), of the axially extending cap edge (172).

16. External rotor motor according to claim 15, characterized in that the damper (16) is fastened radially or axially on the rotor (13).

17. An external rotor motor with a stator (11) and a rotor (13), which surrounds the stator (11) while leaving an air gap (14), wherein at least one damper (16) that is composed at least partially of an elastic material is arranged on the outside of the rotor (13), characterized in that an assembly (26) with a hub (22) driven by the rotor (13) is slid over the damper (16) and non-rotatably connected to the rotor (13), and in that the damper (16) is sprayed onto the inside wall of the hub (22).

18. External rotor motor according to claim 17, characterized in that the damper (16) is clamped between the rotor (13) and the hub (22).

19. External rotor motor according to claim 17, characterized in that the assembly comprises a fan wheel (26) of a fan or blower.

20. An external rotor motor according to claim 17, characterized in that the damper (16) is fastened on the inside of the hub (22).

21. An external rotor motor with a stator (11) and a rotor (13), which surrounds the stator (11) while leaving an air gap (14), wherein at least one damper (16) that is composed at least partially of an elastic material is arranged on the outside of the rotor (13), characterized in that the rotor (13) is pot-shaped with a pot base (131) and pot jacket (132) and that the damper (16) comprises a damper cap (17), which surrounds the pot jacket (132) or at least partially covers the pot base (131), and in that the damper (16) is sprayed on the rotor (13).

22. External rotor motor according to claim 21, characterized in that the damper (16) is fastened radially or axially on the rotor (13).

* * * * *